US00RE47373E

(19) United States
(12) Reissued Patent
Chen et al.

(10) Patent Number: US RE47,373 E
(45) Date of Reissued Patent: Apr. 30, 2019

(54) UTILIZATION OF MOISTURE IN HERMETICALLY SEALED SOLID ELECTROLYTIC CAPACITORS AND CAPACITORS MADE THEREOF

(71) Applicant: Kemet Electronics Corporation, Simpsonville, SC (US)

(72) Inventors: Qingping Chen, Simpsonville, SC (US); Yuri Freeman, Greer, SC (US); Steven C. Hussey, Simpsonville, SC (US)

(73) Assignee: KEMET Electronics Corporation, Simpsonville, SC (US)

(21) Appl. No.: 14/609,591

(22) Filed: Jan. 30, 2015

Related U.S. Patent Documents

Reissue of:
(64) Patent No.: 8,379,371
Issued: Feb. 19, 2013
Appl. No.: 13/112,174
Filed: May 20, 2011

(51) Int. Cl.

| | |
|---|---|
| ***H01G 9/08*** | (2006.01) |
| ***H01G 9/15*** | (2006.01) |
| ***H01G 9/028*** | (2006.01) |
| ***H01G 9/04*** | (2006.01) |
| ***H01G 2/10*** | (2006.01) |

(52) U.S. Cl.
CPC ..... *H01G 2/10* (2013.01); *H01G 9/028* (2013.01); *H01G 9/04* (2013.01); *H01G 9/08* (2013.01); *H01G 9/15* (2013.01); *Y10T 29/435* (2015.01)

(58) Field of Classification Search
CPC .. H01G 2/10; H01G 9/04; H01G 9/15; H01G 9/028; H01G 9/08; Y10T 29/435
USPC ..... 361/535, 516, 518, 523, 536, 537
See application file for complete search history.

(56) References Cited

U.S. PATENT DOCUMENTS

| | | | |
|---|---|---|---|
| 3,343,047 | A | 9/1967 | Comado et al. |
| 3,466,508 | A | 9/1969 | Booe |
| 3,611,054 | A | 10/1971 | Piper et al. |
| 6,052,273 | A | 4/2000 | Inoue |

(Continued)

FOREIGN PATENT DOCUMENTS

| | | |
|---|---|---|
| JP | 1990-207518 | 8/1990 |
| JP | 2009-246288 | 10/2009 |
| JP | 2009-246288 A | 10/2009 |

OTHER PUBLICATIONS

Guillaume Roesch, Extended European Search Report, EP 12 16 8568, dated Sep. 11, 2012.

*Primary Examiner* — Albert J Gagliardi
(74) *Attorney, Agent, or Firm* — Joseph T. Guy; Patent Filing Specialist, Inc.

(57) ABSTRACT

A method for forming a hermetically sealed capacitor including: forming an anode; forming a dielectric on the anode; forming a conductive layer on the dielectric thereby forming a capacitive element; inserting the capacitive element into a casing; electrically connecting the anode to an exterior anode connection; electrically connecting the cathode to an exterior cathode connection; filling the casing with an atmosphere comprising a composition, based on 1 kg of atmosphere, of at least 175 g to no more than 245 g of oxygen, at least 7 g to no more than 11 g of water, at least 734 grams to no more than 818 grams of nitrogen and no more than 10 grams of a minor component; and hermetically sealing the casing with the atmosphere with the capacitive element contained in the casing.

86 Claims, 2 Drawing Sheets

(56) References Cited

U.S. PATENT DOCUMENTS

| | | | | |
|---|---|---|---|---|
| 6,185,090 | B1 * | 2/2001 | Pozdeev-Freeman | 361/524 |
| 6,229,689 | B1 * | 5/2001 | Kobayashi et al. | 361/525 |
| 6,696,138 | B2 * | 2/2004 | Sakai et al. | 428/209 |
| 7,022,264 | B2 * | 4/2006 | Takeuchi et al. | 252/500 |
| 7,388,741 | B2 * | 6/2008 | Konuma et al. | 361/528 |
| 7,515,395 | B2 * | 4/2009 | Morikawa et al. | 361/517 |
| 8,094,434 | B2 * | 1/2012 | Rawal et al. | 361/538 |
| 2007/0188979 | A1 * | 8/2007 | Takeda | H01G 9/028 361/505 |
| 2009/0244812 | A1 | 10/2009 | Rawal et al. | |
| 2011/0085285 | A1 * | 4/2011 | Zednicek | H01G 9/10 361/523 |

* cited by examiner

UTILIZATION OF MOISTURE IN HERMETICALLY SEALED SOLID ELECTROLYTIC CAPACITORS AND CAPACITORS MADE THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present invention is specific to an improved capacitor and method of making an improved capacitor. More specifically, the present invention is directed to a method of manufacturing a hermetically sealed capacitor with improved performance.

Hermetically sealed capacitors have found widespread use in applications where environmental conditions are detrimental to capacitor performance. In general, a hermetically sealed capacitor comprises a capacitive element comprising a valve metal anode with a dielectric thereon and a conductive layer on the dielectric. The capacitive element is then hermetically sealed in a casing. Whereas wet type hermetically sealed capacitors utilize an electrolyte solution as the cathode conductor, hermetically sealed solid electrolytic capacitors use a solid conductor, such as $MnO_2$ or intrinsically conducting polymer, as the cathode conductor. In recent years intrinsically conductive polymers such as poly 3,4-ethylenedioxythiophene (PEDT) have been used as the preferred cathode conductor in electrolytic capacitors due, in part, to their high electrical conductivity and benign failure mode. Capacitors made using in-situ oxidative polymerization or electrochemical polymerization have high DC leakage current and have been limited to use in capacitors intended for applications at lower working voltage. U.S. Pat. No. 7,563,290, which is incorporated herein by reference, describes a method of improving the working voltage of solid electrolytic capacitors by dispersion of prepolymerized conductive polymers.

There has been a long felt desire for improved hermetically sealed capacitors. In particular, there has been a long felt desire for hermetically sealed solid electrolytic capacitors with lower leakage current and good reliability during the useful life of the capacitor.

SUMMARY

It is an object of the invention to provide an improved method of manufacturing a capacitor, and a capacitor obtained thereby with improved performance.

A particular feature is improved leakage current after aging.

These and other advantages, as will be realized, are provided in a method for forming a hermetically sealed capacitor.

The method includes:

forming an anode;

forming a dielectric on the anode;

forming a conductive layer on the dielectric thereby forming a capacitive element;

inserting the capacitive element into a casing; electrically connecting the anode to an exterior anode connection;

electrically connecting the cathode to an exterior cathode connection;

filling the casing with an atmosphere comprising a composition, based on 1 kg of atmosphere, of at least 175 g to no more than 245 g of oxygen, at least 7 g to no more than 11 g of water, at least 734 grams to no more than 818 grams of nitrogen and no more than 10 grams of a minor component; and hermetically sealing the casing with the atmosphere with the capacitive element contained in the casing.

Yet another embodiment is provided in a hermetically sealed capacitor made by the process of:

forming an anode;

forming a dielectric on the anode;

forming a conductive layer on the dielectric thereby forming a capacitive element;

inserting the capacitive element into a casing;

electrically connecting the anode to an exterior anode connection;

electrically connecting the cathode to an exterior cathode connection;

filling the casing with an atmosphere comprising a composition, based on 1 kg of atmosphere, of at least 175 g to no more than 245 g of oxygen, at least 7 g to no more than 11 g of water, at least 734 grams to no more than 818 grams of nitrogen and no more than 10 grams of a minor component; and hermetically sealing the casing with the atmosphere with the capacitive element contained in the casing.

DESCRIPTION

The instant invention is directed to an improved hermetically sealed solid electrolytic capacitor and an improved method of manufacturing a hermetically sealed solid electrolytic capacitor. More specifically, the present invention is directed to a method of hermetically sealing a solid electrolytic capacitor under specific atmospheric conditions which provide an unexpected improvement in aging process and electric characteristics of finished capacitors.

The invention will be described with reference to the figures which form an integral, non-limiting, part of the specification. Throughout the various figures similar elements will be numbered accordingly.

Figure 1:
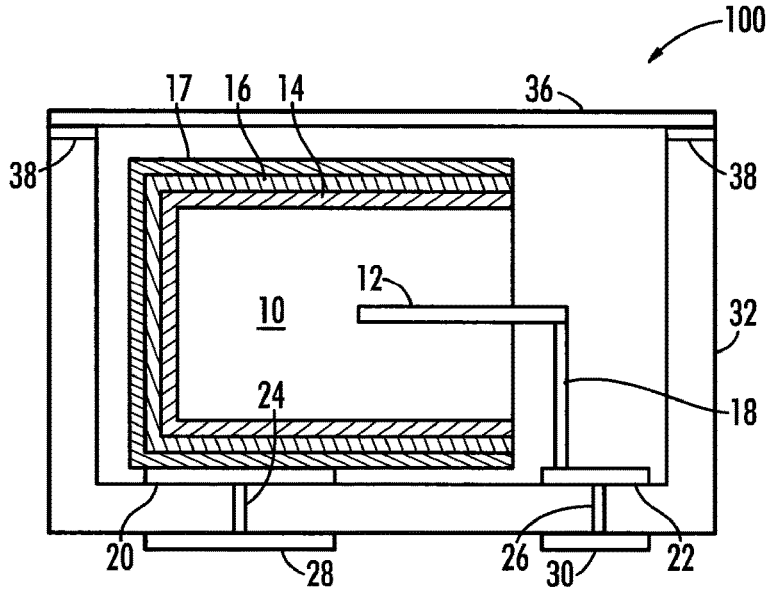
FIG. 1 is a schematic cross-sectional view of an embodiment of the invention.

An embodiment of a hermetically sealed capacitor of the present invention will be described with reference to FIG. 1. In FIG. 1, a hermetically sealed capacitor is represented in schematic cross-sectional view at 100. The capacitor, comprises an anode, 10, which is preferably a monolithic anode body comprising a valve metal. An anode wire, 12, extends from the anode body and can be attached to the anode body by welding or embedded in the anode body by compression. A dielectric, 14, is on the surface of the anode body and preferably at least partially encases the anode body. A conductive layer, 16, which functions as the cathode, is on the surface of the dielectric of the anode body and preferably at least partially encases the dielectric layer. As would be realized, the anode and cathode separated by a dielectric form the capacitive element. Additional conductive layers, 17, are preferably employed to provide an adequate interface for subsequent electrical connections. The additional conductive layers preferably include layers comprising carbon, silver, copper, nickel or other conductive materials either in a binder or as a layer of deposited metal and may include multiple layers. The deposited metal layers can be provided by vapor deposition, electroplating or electroless plating.

The capacitive element is hermetically sealed in a casing, 32, and in one embodiment a non-conducting case. The cathode is in electrical contact with a cathode trace, 20. The cathode and cathode trace can be electrically attached by a conductive adhesive or by welding. The anode wire is in electrical contact with an anode trace, 22, preferably through an anode lead element, 18, between the lead wire and the anode trace. An external cathode connection, 28, is in electrical contact with the cathode trace, 20, by a connector, 24. An external anode connection, 30, is in electrical contact with the anode trace, 22, by a connector, 26. A cap, 36, is secured to the casing by a hermetic seal, 38.

Figure 2:
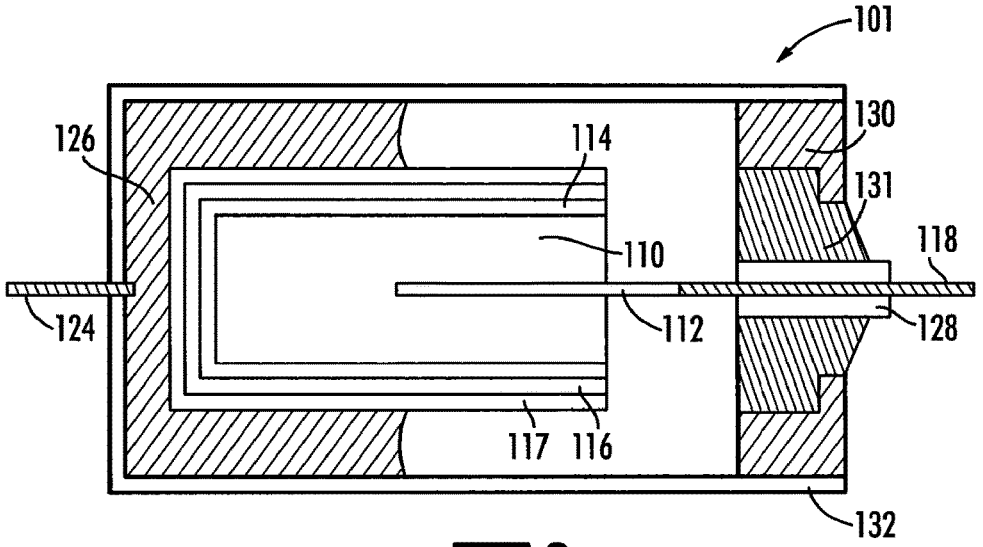
FIG. 2 is a schematic cross-sectional view of an embodiment of the invention.

Another embodiment of a hermetically sealed solid electrolytic capacitor of the present invention will be described with reference to FIG. 2. In FIG. 2, a hermetically sealed capacitor is represented in schematic cross-sectional view at 101. The capacitor, comprises an anode, 110, which is preferably a monolithic anode body comprising a valve metal. An anode wire, 112, extends from the anode body and can be attached to the anode body for example by welding, or embedded in the anode body by compression. A dielectric, 114, is on the surface of the anode body and preferably at least partially encases the anode body. A conductive layer, 116, which functions as the cathode, is on the surface of the dielectric of the anode body and preferably at least partially encases the dielectric layer. As would be realized, the anode and cathode separated by a dielectric form the capacitive element. Additional conductive layers, 117, are preferably employed to provide an adequate interface for subsequent connection to the casing and the cathode lead wire, 124. The additional conductive layers preferably include layers comprising carbon, silver, copper, nickel or other conductive materials either in a binder or as a layer of deposited metal and may include multiple layers. The deposited metal layers can be provided by vapor deposition, electroplating or electroless plating.

The capacitive element is hermetically sealed in a casing, 132, which in one embodiment is a conductive casing. The internal connection material, 126, which connects the conductive layers, 117, to cathode lead wire, 124, can be either an internal solder or an electrically conductive adhesive. The cathode lead, 124, is attached to the casing or it may extend into the internal connection material, 126. An external anode lead, 118, is connected, preferably by welding, to the anode wire, 112. The external anode lead extends out of the casing. A positive seal, 128, contains at least a portion of the external anode lead and/or the anode wire. An edge seal, 131, hermetically seals the casing with the cap material, 130. While not limited thereto, the external anode lead and cathode lead are preferably nickel. Although many metallic and glass to metal seal materials can be used to provide hermetic sealing of the casing, the positive seal material and the edge sealing material are preferably solder.

It has been surprisingly determined that performance of a hermetically sealed solid electrolytic capacitor can be improved by hermetically sealing in a defined atmosphere comprising air and moisture within a predetermined range. This is in direct contrast to expectations in the art since hermetic seals typically prefer those that exclude moisture and oxygen. The edge seal is applied and a hermetic seal formed in an atmosphere comprising a composition, based on 1 Kg of atmosphere, of at least 175 g to no more than 245 g of oxygen, at least 7 g to no more than 11 g of water, at least 734 grams to no more than 818 grams of nitrogen and no more than 10 grams of a minor component wherein the minor component preferably comprises gases selected from the group consisting of carbon dioxide, carbon monoxide, inert gases, methane, hydrogen, ammonia and nitrous oxides. More preferably, the atmosphere has a composition with at least 8 grams to no more than 10 grams of water per Kg of atmosphere.

The method of manufacturing the hermetically sealed solid electroyltic capacitor will be described with reference to FIG. 3.

Figure 3:
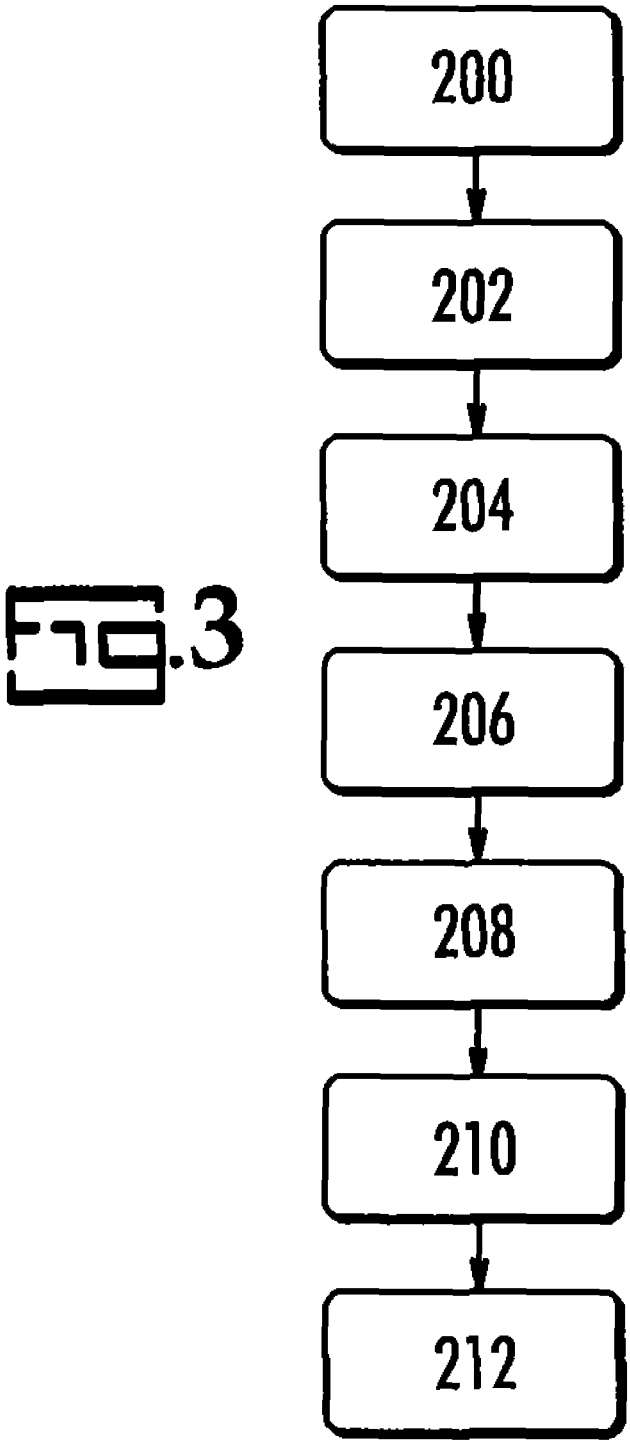
FIG. 3 is a flow chart representation of an embodiment of the invention.

In FIG. 3, an anode is formed at 200. In a preferred embodiment the anode is formed from a powder which is compressed to form a monolithic body. In another embodiment the anode is a foil which is optionally, and preferably, etched to increase surface area. The shape and dimension of the anode is not particularly limited herein. In the case of a compressed powder anode an anode wire can be attached to the anode after compression, such as by welding, or the anode wire can be inserted into the powder and the powder compressed around the anode wire thereby forming an anode with an anode wire embedded in the anode and extending therefrom.

A dielectric is formed on the anode at 202. While not limited thereto, a preferred dielectric is an oxide of the anode material. This is preferred primarily for manufacturing convenience. Preferably, the dielectric is an oxide of Al, W, Ta, Nb, Ti, Zr and Hf with $Al_2O_3$, $Ta_2O_5$ and $Nb_2O_5$ being most preferred. The method of forming the dielectric is not limited herein. Anodization of a valve metal to form a dielectric is well understood in the art and described in detail in U.S. Pat. Nos. 7,678,259; 7,248,462; 6,755,959; 6,652,729; 6,480,371; 6,436,268; 6,346,185; 6,267,861; 6,235,181; 5,716,511; 5,185,075 and 4,812,951. One method for anodization employs anodizing solutions having a water content below approximately 30% in combination with alkanol amine, phosphoric acid and an organic solvent. Monoethanol amine, diethanol amine, triethanol amine, ethyl diethanolamine, diethyl ethanolamine, dimethyl ethanolamine and dimethyl ethoxy ethanolamine (dimethyl amino ethoxy ethanol) are mentioned as alkanol amines. Ethylene glycol, diethylene glycol, polyethylene glycol 300 and tetraethylene glycol dimethyl ether, are mentioned as solvents. It is generally desirable to conduct the anodizing at temperatures below about 50° C., preferably within a pH range of 4-9 which can be adjusted with phosphoric acid if desired.

A cathode is formed on the dielectric at 204. The cathode is a conductor preferably comprising at least one of manganese dioxide or a intrinsically conductive polymeric material as known in the art. The cathode may include multiple layers wherein adhesion layers are employed to improve adhesion between the conductor and the termination. Particularly preferred adhesion layers include carbon, silver, copper, or another conductive material in a binder or a metalized layer such as nickel or silver. Conductive polymeric materials may be employed as a cathode material. Particularly preferred intrinsically conductive polymers include polypyrrole, polyaniline, polythiophene and their derivatives. A particularly preferred conductive polymer is poly 3,4-ethylenedioxythiophene (PEDT). PEDT can be made by in situ polymerization of EDT monomer such as Clevius M V2 which is commercially available from Hereaus Clevious with an oxidizer such as ferric tosylate solution available as Clevios® C from Hereaus Clevios. The application and polymerization of heterocyclic conductive polymers such as polypyrrole, polyaniline, polythiophene and their derivatives is widely described and well known to those of skill in the art. Additional conductive layers preferably include layers comprising carbon, silver, copper, nickel or other conductive materials either in a binder or as a layer of deposited metal and may include multiple layers are preferably deposited on the polymeric cathode layer to improve subsequent adhesion.

The capacitive element, which comprises an anode and cathode with a dielectric there between, is inserted into a casing at 206. The casing preferably has a cavity within which the capacitive couple resides. The anode wire is electrically connected to an external anode connection and the cathode is electrically connected to an external cathode connection. In one embodiment the casing comprises connectors between internal traces and external connections wherein the capacitor is electrically connected to the internal traces by welding, conductive adhesive or the like.

An atmosphere is provided at 208 wherein the atmosphere comprises a composition, based on 1 kg of atmosphere, of at least 175 g to no more than 245 g of oxygen, at least 7 g to no more than 11 g of water and more preferably at least 8 g to no more than 10 g of water, at least 734 grams to no more than 818 grams of nitrogen and no more than 10 grams of minor components wherein the minor components preferably comprise gases selected from the group consisting of carbon dioxide, carbon monoxide, inert gases, methane, hydrogen, ammonia and nitrous oxides. More preferably, the atmosphere comprises at least 200 g to no more than 220 g of oxygen per kg of atmosphere. The case is hermetically sealed in the provided atmosphere at 210.

It is preferred that the capacitors be tested at 212. One portion of the testing is a burn-in wherein the capacitor is subjected to 1.0 to 1.5 times of the rated voltage at a temperature of 50° C. to 150° C. More preferably, the capacitor is aged at 1.2 to 1.4 times of the rated voltage at a temperature of 75° C. to 125° C.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably, the anode comprises at least one material selected from the group consisting of Al, Ta, Nb and NbO.

The anode wire is most preferably constructed of the same material as the anode. The anode wire can be welded onto the anode surface under protective atmosphere or inserted into a powder prior to compression of the powder to form a porous anode body.

The dielectric is a non-conductive layer which is not particularly limited herein. The dielectric may be a metal oxide or a ceramic material. A particularly preferred dielectric is the oxide of an anode metal due to the simplicity of formation and ease of use.

The casing can be a metal or a ceramic. The casing may include a single layer or multiple layers with aluminum nitride, aluminum oxide, silicon oxide, magnesium oxide and calcium oxide being mentioned as exemplary materials. Conductive materials, such as a metal, are mentioned as exemplary for demonstration of the invention. The metal casing may include a surface coating on the interior and/or exterior thereof to increase conductivity or to improve solderability. A conductive casing may be constructed of brass with a solder coating, such as a Sn/Pb plating, on the inside and outside of the casing. The width, length and depth of the casing are selected for the application and are not otherwise limited herein. It would be readily apparent that a minimal size consistent with the application is preferred. In general, a length of 1 to about 25 millimeters with a width, or diameter in the case of a cylindrical case, of 0.5 to 10 millimeters is mentioned as being suitable for demonstration of the invention.

The capacitive element can be electrically connected to the casing in any manner known in the art. In one embodiment various surfaces of the casing may comprise interior conductive traces, or conductive pads, that are electrically connected to exterior conductive traces or conductive pads. The capacitive element is then electrically connected to the interior conductive traces or conductive pads and the exterior conductive traces or conductive pads are connected to a circuit trace to add capacitance to a circuit. The conductive trace or conductive pad is a conductive material without limit. Copper, nickel, silver, zinc, tin, palladium, lead, aluminum, molybdenum, titanium, iron, zirconium, tungsten, magnesium and alloys thereof are mentioned as suitable for demonstration of the instant invention. Copper, copper alloys; such as copper-zirconium, copper-magnesium, copper-zinc or copper-iron; nickel, nickel alloys; such as nickel-iron; and gold coated metal layers are particularly suitable for demonstration of the invention. An ink containing the conductor may be deposited in a predetermined pattern, such as by ink jet printing, to form the conductive traces or conductive pads.

The internal conductive traces or conductive pads may be electrically connected to external conductive traces or pads thereby allowing the hermetically sealed capacitor to be mounted on a surface. The internal conductive traces or conductive pads and external conductive traces or conductive pads are electrically connected by any method known in the art. The conductive material may extend through the casing or may be in the form of pins, pads, sheets, etc. The external conductive traces or conductive pads are preferably as thin as possible to minimize total size of the hermetically sealed capacitor with the proviso that adequate conductivity is achieved.

EXAMPLES

A series of identical capacitive elements were prepared with a cylindrical tantalum anode with a diameter of 5.2 mm and a length of 10.7 mm comprising a tantalum wire lead. A tantalum pentoxide dielectric was prepared as taught in accordance with U.S. Pat. No. 5,716,511. A cathode layer was formed using prepolymerized PEDT dispersion, Clevios K available from Hereaus Clevios as taught in U.S. Pat. No. 7,563,290. Carbon containing and silver containing layers were coated on the PEDT layers for adhesion. Each capacitive couple was placed in a nickel coated brass casing with an outside diameter of 7.1 mm, a height of 16.5 mm and a wall thickness of 0.30 mm. Using a Sn62.5/Pb26.1/Ag1.4 solder an electrically conductive bond is formed between the cathode and the casing. The samples were separated for separate treatment. One set of samples were directly sealed right after the bonding between the cathode and the casing by solder. An inventive set of samples was treated for 24 hours in an air atmosphere maintained at about 50% relative humidity at 23° C. or about 8.8 grams of water per kilogram of air atmosphere after bonding between the cathode and the casing by solder. Both sample sets were hermetically sealed by an edge seal and a positive seal both comprising Sn60/Pb40 solder. The entire population of sealed capacitors was heated to a temperature of 125° C. A subpopulation of each set was maintained with no voltage and another subpopulation was maintained a ⅔ rated voltage, which was 40 volts, for a period of time as set forth in the tables. The capacitance in microfarads (CAP), dissipation factor in percent (DF), equivalent series resistance in ohms (ESR) and DC leakage current in microamperes (LKG) were measured and recorded. CAP and DF were measured with an AC signal at 120 Hz while ESR was measured at 100 KHz, as well known in the industry. The DC leakage was measured with rated voltage of 60V and a charging time of less than 300 seconds. The initial results are indicated in Table 1, the results after 23 hours are recorded in Table 2 and the results after 100 hours are recorded in Table 3.

As indicated in the Tables, the capacitor prepared with a moist seal had higher capacitance initially and much lower leakage after aging testing. In particular, the leakage current of the capacitors was improved considerably after the burn-in.

TABLE 1

| 125° C. NO VOLTAGE INITIAL | | | | 125° C. and ⅔ RATED VOLTAGE INITIAL | | | |
|---|---|---|---|---|---|---|---|
| CAP | DF | ESR | LKG 60 V | CAP | DF | ESR | LKG 60 V |
| DRY SEAL | | | | DRY SEAL | | | |
| 83.9 | 2.7 | 0.06 | 1.03 | 83.9 | 2.7 | 0.07 | 0.97 |
| 83.5 | 2.8 | 0.06 | 1.24 | 84.6 | 2.7 | 0.05 | 0.93 |
| 83.3 | 2.9 | 0.07 | 1.08 | 83.8 | 3.5 | 0.05 | 1.14 |
| 84.4 | 2.7 | 0.06 | 1.11 | 84.7 | 3.4 | 0.06 | 1.21 |
| 84.7 | 2.7 | 0.05 | 1.00 | | NONE | | |
| MOIST SEAL | | | | MOIST SEAL | | | |
| 93.9 | 3.7 | 0.06 | 0.55 | 95.6 | 3.3 | 0.05 | 0.58 |
| 94.7 | 3.4 | 0.05 | 0.55 | 93.3 | 3.5 | 0.05 | 0.59 |
| 95.2 | 3.4 | 0.06 | 0.55 | 94.4 | 3.5 | 0.05 | 5.56 |
| 94.3 | 3.5 | 0.05 | 0.56 | 94.2 | 3.4 | 0.04 | 5.66 |
| 94.7 | 3.4 | 0.05 | 0.57 | | NONE | | |

TABLE 2

| 125° C. NO VOLTAGE 23 HRS | | | | 125° C. and ⅔ RATED VOLTAGE 23 HRS | | | |
|---|---|---|---|---|---|---|---|
| CAP | DF | ESR | LKG 60 V | CAP | DF | ESR | LKG 60 V |
| DRY SEAL | | | | DRY SEAL | | | |
| 84.8 | 3.0 | 0.06 | 19.98 | 84.1 | 3.0 | 0.06 | 9.18 |
| 84.3 | 3.0 | 0.05 | 69.12 | 84.6 | 2.9 | 0.05 | 0.95 |
| 84.6 | 3.0 | 0.05 | 12.71 | 84.1 | 3.8 | 0.05 | 1.29 |
| 84.8 | 3.1 | 0.05 | 144.48 | 85.8 | 3.9 | 0.05 | 1.30 |
| 85.0 | 3.2 | 0.04 | 13.93 | | NONE | | |
| MOIST SEAL | | | | MOIST SEAL | | | |
| 93.0 | 3.8 | 0.05 | 18.24 | 94.7 | 3.2 | 0.05 | 1.86 |
| 93.8 | 3.7 | 0.05 | 1.19 | 91.9 | 3.6 | 0.06 | 0.61 |
| 94.0 | 3.6 | 0.07 | 1.83 | 93.2 | 3.4 | 0.06 | 3.39 |
| 93.5 | 3.7 | 0.05 | 0.79 | 92.6 | 3.4 | 0.04 | 1.04 |
| 93.6 | 3.6 | 0.05 | 0.98 | | NONE | | |

TABLE 3

| 125° C. NO VOLTAGE 100 HRS | | | | 125° C. and ⅔ RATED VOLTAGE 100 HRS | | | |
|---|---|---|---|---|---|---|---|
| CAP | DF | ESR | LKG 60 V | CAP | DF | ESR | LKG 60 V |
| DRY SEAL | | | | DRY SEAL | | | |
| 84.1 | 2.9 | 0.06 | 259.78 | 83.0 | 2.7 | 0.06 | 74.47 |
| 83.5 | 3.0 | 0.05 | 378.50 | 83.4 | 2.6 | 0.05 | 6.06 |
| 83.8 | 3.0 | 0.05 | 87.65 | 83.8 | 3.5 | 0.05 | 41.34 |
| 84.2 | 3.2 | 0.06 | 50.40 | 85.2 | 3.7 | 0.06 | 16.93 |
| 84.0 | 3.0 | 0.05 | 113.59 | | NONE | | |
| MOIST SEAL | | | | MOIST SEAL | | | |
| 91.4 | 3.8 | 0.06 | 9.60 | 93.1 | 3.1 | 0.06 | 0.98 |
| 92.3 | 3.5 | 0.06 | 4.34 | 90.3 | 3.4 | 0.06 | 3.23 |
| 92.7 | 3.5 | 0.06 | 3.93 | 91.5 | 3.2 | 0.06 | 4.19 |
| 92.1 | 3.6 | 0.05 | 4.80 | 91.0 | 3.1 | 0.05 | 2.17 |
| 92.1 | 3.5 | 0.05 | 6.75 | | NONE | | |

The invention has been described with reference to preferred embodiments without limit thereto. One of skill in the art would readily appreciate additional embodiments and improvements which are within the scope of the invention as more specifically set forth in the claims appended hereto.

The invention claimed is:

1. A method for forming a hermetically sealed capacitor comprising:

forming an anode;

forming a dielectric on said anode;

forming a *cathode by forming a solid* conductive layer on said dielectric thereby forming a capacitive element;

inserting said capacitive element into a casing;

electrically connecting said anode to an exterior anode connection;

electrically connecting said cathode to an exterior cathode connection;

filling said casing with an atmosphere comprising a composition, based on 1 kg of atmosphere, of at least 175 g to no more than 245 g of oxygen, at least 7 g to no more than 11 g of water, at least 734 grams to no more than 818 grams of nitrogen and no more than 10 grams of a minor component;

*allowing a time sufficient to allow said polymeric cathode to reach equilibrium;* and hermetically sealing said casing with said atmosphere with said capacitive element contained in said casing.

2. The method for forming a hermetically sealed capacitor of claim 1 wherein said minor component comprises gases consisting essentially of argon, carbon dioxide, carbon monoxide, inert gas, methane, hydrogen, ammonia and nitrous oxides.

3. The method for forming a hermetically sealed capacitor of claim 1 wherein said atmosphere comprises at least 200 g to no more than 220 g of oxygen.

4. The method for forming a hermetically sealed capacitor of claim 1 wherein said atmosphere comprises at least 8 g to no more than 10 g of water.

5. The method for forming a hermetically sealed capacitor of claim 1 wherein said anode comprises a valve metal or a conductive oxide of said valve metal.

6. The method for forming a hermetically sealed capacitor of claim 5 wherein said valve metal is selected from Al, W, Ta, Nb, Ti, Zr and Hf.

7. The method for forming a hermetically sealed capacitor of claim 5 wherein said anode comprises a material selected from the group consisting of Ta, Nb and NbO.

8. The method for forming a hermetically sealed capacitor of claim 1 wherein said dielectric is an oxide of an anode material.

9. The method for forming a hermetically sealed capacitor of claim 8 wherein said dielectric is selected from $Nb_2O_5$, $Ta_2O_5$ and $Al_2O_3$.

10. The method for forming a hermetically sealed capacitor of claim 1 wherein said conductive layer comprises at least one material selected from manganese dioxide and a conductive polymer.

11. The method for forming a hermetically sealed capacitor of claim 10 wherein said conductive polymer is a prepolymerized dispersion of intrinsically conductive polymer.

12. The method for forming a hermetically sealed capacitor of claim 10 wherein said conductive polymer is a polythiophene.

13. The method for forming a hermetically sealed capacitor of claim 12 wherein said polythiophene is a prepolymerized dispersion of polythiophene.

14. The method for forming a hermetically sealed capacitor of claim 12 wherein said polythiophene is poly 3,4-ethylenedioxythiophene.

15. The method for forming a hermetically sealed capacitor of claim 14 wherein said poly 3,4-ethylenedioxythiophene is a prepolymerized dispersion of poly 3,4-ethylenedioxythiophene.

16. The method for forming a hermetically sealed capacitor of claim 1 further comprising an anode wire extending from said anode.

17. The method for forming a hermetically sealed capacitor of claim 1 wherein at least one of said external anode connection or said external cathode connection comprises nickel.

18. The method for forming a hermetically sealed capacitor of claim 1 wherein said casing further comprises conducting traces.

19. The method for forming a hermetically sealed capacitor of claim 1 further comprising applying solder between said cathode and said casing.

20. The method for forming a hermetically sealed capacitor of claim 19 wherein said external cathode lead is in electrical contact with said solder.

21. The method for forming a hermetically sealed capacitor of claim 1 wherein said hermetically sealing comprises forming a seal with solder.

22. A hermetically sealed capacitor made by the process of:

forming an anode;

forming a dielectric on said anode;

forming *a cathode by forming* a *solid* conductive layer on said dielectric thereby forming a capacitive element;

inserting said capacitive element into a casing;

electrically connecting said anode to an exterior anode connection;

electrically connecting said cathode to an exterior cathode connection;

filling said casing with an atmosphere comprising a composition, based on 1 kg of atmosphere, of at least 175 g to no more than 245 g of oxygen, at least 7 g to no more than 11 g of water, at least 734 grams to no more than 818 grams of nitrogen and no more than 10 grams of a minor component; and

*allowing a time sufficient to allow said polymeric cathode to reach equilibrium;* hermetically sealing said casing with said atmosphere with said capacitive element contained in said casing.

23. The hermetically sealed capacitor of claim 22 wherein said anode comprises a valve metal or a conductive oxide of said valve metal.

24. The hermetically sealed capacitor of claim 23 wherein said valve metal is selected from Al, W, Ta, Nb, Ti, Zr and Hf.

25. The hermetically sealed capacitor of claim 23 wherein said anode comprises a material selected from the group consisting of Nb and NbO.

26. The hermetically sealed capacitor of claim 22 wherein said dielectric is an oxide of an anode material.

27. The hermetically sealed capacitor of claim 26 wherein said dielectric is selected from $Nb_2O_5$, $Ta_2O_5$ and $Al_2O_3$.

28. The hermetically sealed capacitor of claim 22 wherein said conductive layer comprises at least one material selected from manganese dioxide and a conductive polymer.

29. The hermetically sealed capacitor of claim 28 wherein said conductive polymer is a prepolymerized dispersion.

30. The hermetically sealed capacitor of claim 28 wherein said conductive polymer is a polythiophene.

31. The hermetically sealed capacitor of claim 30 wherein said polythiophene is poly 3,4-ethylenedioxythiophene.

32. The hermetically sealed capacitor of claim 30 wherein said poly 3,4-ethylenedioxythiophene is prepolymerized dispersion of poly 3,4-ethylenedioxythiophene.

33. The hermetically sealed capacitor of claim 28 wherein said polythiophene is prepolymerized dispersion of polythiophene.

34. The hermetically sealed capacitor of claim 22 wherein said minor component comprises gases consisting essentially of argon, carbon dioxide, carbon monoxide, inert gas, methane, hydrogen, ammonia and nitrous oxides.

35. The hermetically sealed capacitor of claim 22 wherein said atmosphere comprises at least 200 g to no more than 220 g of oxygen.

36. The hermetically sealed capacitor of claim 22 wherein said atmosphere comprises at least 8 g to no more than 10 g of water.

37. The hermetically sealed capacitor of claim 22 wherein at least one of said external anode connection or said external cathode connection comprises nickel.

38. The hermetically sealed capacitor of claim 22 wherein said casing further comprises conducting traces.

39. The hermetically sealed capacitor of claim 22 further comprising applying solder between said cathode and said casing.

40. The hermetically sealed capacitor of claim 39 wherein said external cathode lead is in electrical contact with said solder.

*41. A method for forming a hermetically sealed capacitor comprising:*

*forming an anode;*

*forming a dielectric on said anode;*

*forming a solid cathode by forming a conductive layer on said dielectric thereby forming a capacitive element;*

*inserting said capacitive element into a casing;*

*electrically connecting said anode to an exterior anode connection;*

*electrically connecting said cathode to an exterior cathode connection; and*

*after a time sufficient to allow said polymeric cathode to reach equilibrium hermetically sealing said casing with said capacitive element contained in said casing.*

*42. The method for forming a hermetically sealed capacitor of claim 41 wherein said casing comprises a controlled atmosphere comprising at least 175 g to no more than 245 g of oxygen.*

*43. The method for forming a hermetically sealed capacitor of claim 42 wherein said controlled atmosphere comprises at least 734 g to no more than 818 g of nitrogen.*

*44. The method for forming a hermetically sealed capacitor of claim 42 wherein said controlled atmosphere comprises a minor component selected from the group consisting of argon, carbon dioxide, carbon monoxide, methane, hydrogen, ammonia and nitrous oxide.*

*45. The method for forming a hermetically sealed capacitor of claim 44 wherein said controlled atmosphere comprises no more than 10 g of said minor component.*

*46. The method for forming a hermetically sealed capacitor of claim 42 wherein said controlled atmosphere comprises at least 200 g to no more than 220 g of oxygen.*

*47. The method for forming a hermetically sealed capacitor of claim 42 wherein said controlled atmosphere comprises at least 8 g to no more than 10 g of water.*

*48. The method for forming a hermetically sealed capacitor of claim 42 wherein said anode comprises a valve metal or a conductive oxide of said valve metal.*

*49. The method for forming a hermetically sealed capacitor of claim 48 wherein said valve metal is selected from the group consisting of Al, W, Ta, Nb, Ti, Zr and Hf.*

*50. The method for forming a hermetically sealed capacitor of claim 48 wherein said anode comprises a material selected from the group consisting of Ta, Nb and NbO.*

*51. The method for forming a hermetically sealed capacitor of claim 41 wherein said dielectric is an oxide of an anode material.*

*52. The method for forming a hermetically sealed capacitor of claim 51 wherein said dielectric is selected from* $Nb_2O_5$, $Ta_2O_5$ *and* $Al_2O_3$.

*53. The method for forming a hermetically sealed capacitor of claim 41 wherein said conductive layer comprises at least one material selected from manganese dioxide and a conductive polymer.*

*54. The method for forming a hermetically sealed capacitor of claim 53 wherein said polythiophene is a prepolymerized dispersion of intrinsically conducting polymer.*

*55. The method for forming a hermetically sealed capacitor of claim 53 wherein said conductive polymer is a polythiophene.*

*56. The method for forming a hermetically sealed capacitor of claim 55 wherein said polythiophene is poly 3,4-ethylenedioxythiophene.*

*57. The method for forming a hermetically sealed capacitor of claim 56 wherein said poly 3,4-ethylenedioxythiophene is a prepolymerized dispersion of poly 3,4-ethylenedioxythiophene.*

*58. The method for forming a hermetically sealed capacitor of claim 41 further comprising an anode wire extending from said anode.*

*59. The method for forming a hermetically sealed capacitor of claim 41 wherein at least one said external anode connection or said external cathode connection comprises nickel.*

*60. The method for forming a hermetically sealed capacitor of claim 41 wherein said casing further comprises conducting traces.*

*61. The method for forming a hermetically sealed capacitor of claim 60 wherein said hermetically sealing comprises forming a seal with solder.*

*62. The method for forming a hermetically sealed capacitor of claim 41 further comprising applying solder between said cathode and said casing.*

*63. The method for forming a hermetically sealed capacitor of claim 62 wherein said hermetically sealing comprises forming a seal with additional solder.*

*64. A hermetically sealed capacitor made by the process of:*

*forming an anode;*

*forming a dielectric on said anode;*

*forming a cathode by forming a solid conductive layer on said dielectric thereby forming a capacitive element;*

*inserting said capacitive element into a casing;*

*electrically connecting said anode to an exterior anode connection;*

*electrically connecting said cathode to an exterior cathode connection; and*

*after a time sufficient to allow said polymeric cathode to reach equilibrium hermetically sealing said casing with said capacitive element contained in said casing wherein said conductive layer is in equilibrium with an atmosphere in said casing.*

*65. The hermetically sealed capacitor of claim 64 wherein said anode comprises a valve metal or a conductive oxide of said valve metal.*

*66. The hermetically sealed capacitor of claim 65 wherein said valve metal is selected from the group consisting of Al, W, Ta, Nb, Ti, Zr and Hf.*

*67. The hermetically sealed capacitor of claim 65 wherein said anode comprises a material selected from the group consisting of Ta, Nb and NbO.*

*68. The hermetically sealed capacitor of claim 64 wherein said atmosphere comprises at least 175 g to no more than 245 g of oxygen.*

*69. The hermetically sealed capacitor of claim 64 wherein said atmosphere comprises at least 734 g to no more than 818 g of nitrogen.*

*70. The hermetically sealed capacitor of claim 64 wherein said atmosphere comprises a minor component selected from the group consisting of argon, carbon dioxide, carbon monoxide, methane, hydrogen, ammonia and nitrous oxide.*

*71. The hermetically sealed capacitor of claim 70 wherein said atmosphere comprises no more than 10 g of said minor component.*

*72. The hermetically sealed capacitor of claim 64 wherein said atmosphere comprises at least 200 g to no more than 220 g of oxygen.*

*73. The hermetically sealed capacitor of claim 64 wherein said atmosphere comprises at least 8 g to no more than 10 g of water.*

*74. The hermetically sealed capacitor of claim 64 wherein said dielectric is an oxide of an anode material.*

*75. The hermetically sealed capacitor of claim 74 wherein said dielectric is selected from* $Nb_2O_5$, $Ta_2O_5$ *and* $Al_2O_3$.

*76. The hermetically sealed capacitor of claim 64 wherein said conductive layer comprises at least one material selected from manganese dioxide and a conductive polymer.*

*77. The hermetically sealed capacitor of claim 76 wherein said conductive polymer is a prepolymerized dispersion of intrinsically conducting polymer.*

*78. The hermetically sealed capacitor of claim 76 wherein said conductive polymer is a polythiophene.*

*79. The hermetically sealed capacitor of claim 78 wherein said polythiophene is poly 3,4-ethylenedioxythiophene.*

*80. The hermetically sealed capacitor of claim 79 wherein said poly 3,4-ethylenedioxythiophene is a prepolymerized dispersion of poly 3,4-ethylenedioxythiophene.*

*81. The hermetically sealed capacitor of claim 64 further comprising an anode wire extending from said anode.*

*82. The hermetically sealed capacitor of claim 64 wherein at least one said external anode connection or said external cathode connection comprises nickel.*

*83. The hermetically sealed capacitor of claim 64 wherein said casing further comprises conducting traces.*

*84. The hermetically sealed capacitor of claim 64 further comprising applying solder between said cathode and said casing.*

*85. The hermetically sealed capacitor of claim 84 wherein said hermetically sealing comprises forming a seal with solder.*

*86. The hermetically sealed capacitor of claim 85 wherein said external cathode lead is in electrical contact with said solder.*

* * * * *